(12) United States Patent
Collet Romea et al.

(10) Patent No.: US 10,796,185 B2
(45) Date of Patent: Oct. 6, 2020

(54) DYNAMIC GRACEFUL DEGRADATION OF AUGMENTED-REALITY EFFECTS

(71) Applicant: Facebook, Inc., Menlo Park, CA (US)

(72) Inventors: Alvaro Collet Romea, Seattle, WA (US); Tullie Murrell, Mountain View, CA (US); Hermes Germi Pique Corchs, Menlo Park, CA (US); Krishnan Ramnath, Redmond, WA (US); Thomas Ward Meyer, Palo Alto, CA (US); Jiao Li, Sunnyvale, CA (US); Steven Kish, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 141 days.

(21) Appl. No.: 15/803,428

(22) Filed: Nov. 3, 2017

(65) Prior Publication Data
US 2019/0138834 A1 May 9, 2019

(51) Int. Cl.
G06K 9/32 (2006.01)
G06F 3/01 (2006.01)
G06K 9/00 (2006.01)
G06K 9/20 (2006.01)
G06T 19/00 (2011.01)

(52) U.S. Cl.
CPC ............ G06K 9/3241 (2013.01); G06F 3/011 (2013.01); G06K 9/00221 (2013.01); G06K 9/2054 (2013.01); G06T 19/006 (2013.01)

(58) Field of Classification Search
CPC ............................... G06F 3/011; G06T 19/006
See application file for complete search history.

(56) References Cited

U.S. PATENT DOCUMENTS

| | | | | |
|---|---|---|---|---|
| 10,133,951 | B1* | 11/2018 | Mendonca | G06K 9/325 |
| 2009/0169053 | A1* | 7/2009 | Vendrig | G06K 9/32 382/103 |
| 2013/0058523 | A1* | 3/2013 | Wu | G06K 9/00785 382/103 |

(Continued)

OTHER PUBLICATIONS

International Search Report and Written Opinion for International Application No. PCT/US2017/060118, dated Aug. 13, 2018.

(Continued)

*Primary Examiner* — Gandhi Thirugnanam
(74) *Attorney, Agent, or Firm* — Baker Botts L.L.P.

(57) ABSTRACT

In one embodiment, a method includes generating, by a device, first tracking data using a first tracking algorithm, based on first video frames associated with a scene. An augmented-reality (AR) effect may be displayed based on the first tracking data. The device may generate a first confidence score associated with the first tracking data and determine that the first confidence score is above a threshold. The device may generate, based on second video frames subsequent to the first video frames, second tracking data using the first tracking algorithm. The device may determine that an associated second confidence score is below a threshold. In response, the device may generate, based on third video frames subsequent to the second video frames, third tracking data using a second tracking algorithm different from the first. The device may then display the AR effect based on the third tracking data.

20 Claims, 5 Drawing Sheets

(56) References Cited

U.S. PATENT DOCUMENTS

| | | | | |
|---|---|---|---|---|
| 2014/0169663 A1* | 6/2014 | Han | ................... | G06K 9/00724 |
| | | | | 382/159 |
| 2014/0233798 A1* | 8/2014 | Cho | ......................... | G06T 7/20 |
| | | | | 382/103 |
| 2014/0347263 A1* | 11/2014 | Dai | ........................ | G06F 3/017 |
| | | | | 345/156 |
| 2016/0284099 A1* | 9/2016 | Swaminathan | .... | G06K 9/00671 |
| 2016/0335519 A1* | 11/2016 | Wagner | ................ | G06K 9/4671 |
| 2016/0342837 A1* | 11/2016 | Hong | ................. | G06K 9/00624 |
| 2017/0061229 A1* | 3/2017 | Rastgar | .................... | G06K 9/46 |
| 2018/0137632 A1* | 5/2018 | Takada | ................... | G06T 7/262 |
| 2019/0138834 A1* | 5/2019 | Collet Romea | ......... | G06F 3/011 |

OTHER PUBLICATIONS

Extended Search Report for EP Patent Application No. 18171066.6-1210, dated Nov. 2, 2018.

Olson et al., "A Real-Time Multistage IR Image-Based Tracker", Visual Communications and Image Processing, vol. 3692, pp. 226-233, Apr. 1, 1999.

* cited by examiner

DYNAMIC GRACEFUL DEGRADATION OF AUGMENTED-REALITY EFFECTS

TECHNICAL FIELD

This disclosure generally relates to augmented reality effects, and in particular to systems and methods for tracking objects.

BACKGROUND

Augmented Reality (AR) effects are computer-generated visual effects (e.g., images and animation) that are superimposed or integrated into a user's view of a real-world scene. Certain AR effects may be configured to track objects in the real world. For example, a computer-generated unicorn may be placed on a real-world table as captured in a video. As the table moves in the captured video (e.g., due to the camera moving or the table being carried away), the generated unicorn may follow the table so that it continues to appear on top of the table. To achieve this effect, an AR application may use tracking algorithms to track the positions and/or orientations of objects appearing in the real-world scene and use the resulting tracking data to generate the appropriate AR effect. Since AR effects may augment the real-world scene in real-time or near real-time while the scene is being observed, tracking data may need to be generated in real-time or near real-time so that the AR effect appears as desired.

Tracking algorithms, however, may require significant hardware resources in order to dynamically generate the desired results. Since an AR application may be run on devices with different levels of resources and capabilities, a one-size-fits-all approach may result in compromised quality. For example, an AR application that implements the best, but most costly algorithm (in terms of computational requirements) may generate AR effects with significant lag or frame drops on any device short of the best. On the other hand, if the AR application instead implements a less costly algorithm that produces results that are less than optimal, doing so would mean that the AR application would not be running at its full potential on state-of-the-art devices. In addition to the hardware on which an AR application runs, it may be difficult to predict the kind of real-world objects that a tracking algorithm may be asked to track. Since certain tracking algorithms may be more suitable than others for tracking objects with certain characteristics, an AR application that implements a single tracking algorithm may under perform at times. For example, if the AR application implements a highly accurate but less robust tracking algorithm, the AR application may be limited to particular operating conditions that are suitable for that algorithm. On the other hand, if the AR application implements a more robust but less accurate tracking algorithm, it would be performing suboptimally in situations where other more accurate tracking algorithm are available.

SUMMARY OF PARTICULAR EMBODIMENTS

Embodiments described herein relate to systems and methods for enabling an AR application to dynamically switch between different algorithms to produce optimal AR effects given the underlying device's capabilities and current in-operation environment. Particular embodiments for switching between these algorithms take a progressive downgrading (e.g., with respect to accuracy and/or computational costs) approach. What this means is that the algorithm may initially try to track objects using high-quality algorithms that require the highest computational resources, and downgrade to the next tier of algorithms that require less computational resources, until performance is satisfactory. Particular embodiments described herein may, therefore, improve the robustness of AR applications, as the manner in which AR effects are generated may dynamically adjust based on real-time performance and/or device resources. Furthermore, since the accuracy and performance of tracking algorithms may also depend on characteristics of the real-world scene (e.g., shapes and movements of objects, lighting, etc.), the most appropriate tracking algorithm may be dynamically selected to produce optimal results as the real-world scene changes.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Embodiments described herein relate to systems and methods for enabling an AR application to dynamically switch between different algorithms to produce optimal AR effects given the underlying device's capabilities and current in-operation environment. For example, an AR application may initially try to track an object using a particular tracking algorithm (e.g., SLAM, described in further detail below), which may output a corresponding confidence score (e.g., based on the number of points tracked) that represents a confidence level in how well the object is being tracked. If the confidence score is sufficiently low, the AR application may try using another tracking algorithm (e.g., region-based tracking, described in further detail below) that is computationally less expensive. If the confidence score associated with the second tracking algorithm is satisfactory, the AR application may continue to track the object using that algorithm. However, upon detection that the confidence score has dropped to an unacceptable level (e.g., changes in lighting condition), the AR application may then switch to using the device's gyroscope. When this occurs, the system may conceptually apply the gyroscope data to the last-known model of the environment and assume that relative positions of the previously detected objects therein remain the same.

In particular embodiments, an AR application may be configured to operate on any computing device, including mobile devices (e.g., smartphones, tablets, laptops, AR glasses, etc.) and other types of computing devices (e.g., desktop computer). Computing devices may have different hardware resources and capabilities, including, for example, CPU and/or GPU, memory, cache, storage, optical sensors, display, and any other system resources that may affect the quality of the AR effect produced by the AR application. In particular embodiments, an AR application may be configured to obtain video frames of a real-world scene captured by a camera communicatively coupled to the device on which the AR application is running. By processing the video frames, the AR application may track real-world objects captured within the video frames. In particular embodiments, the AR application may support multiple types of tracking algorithms.

Figure 1:
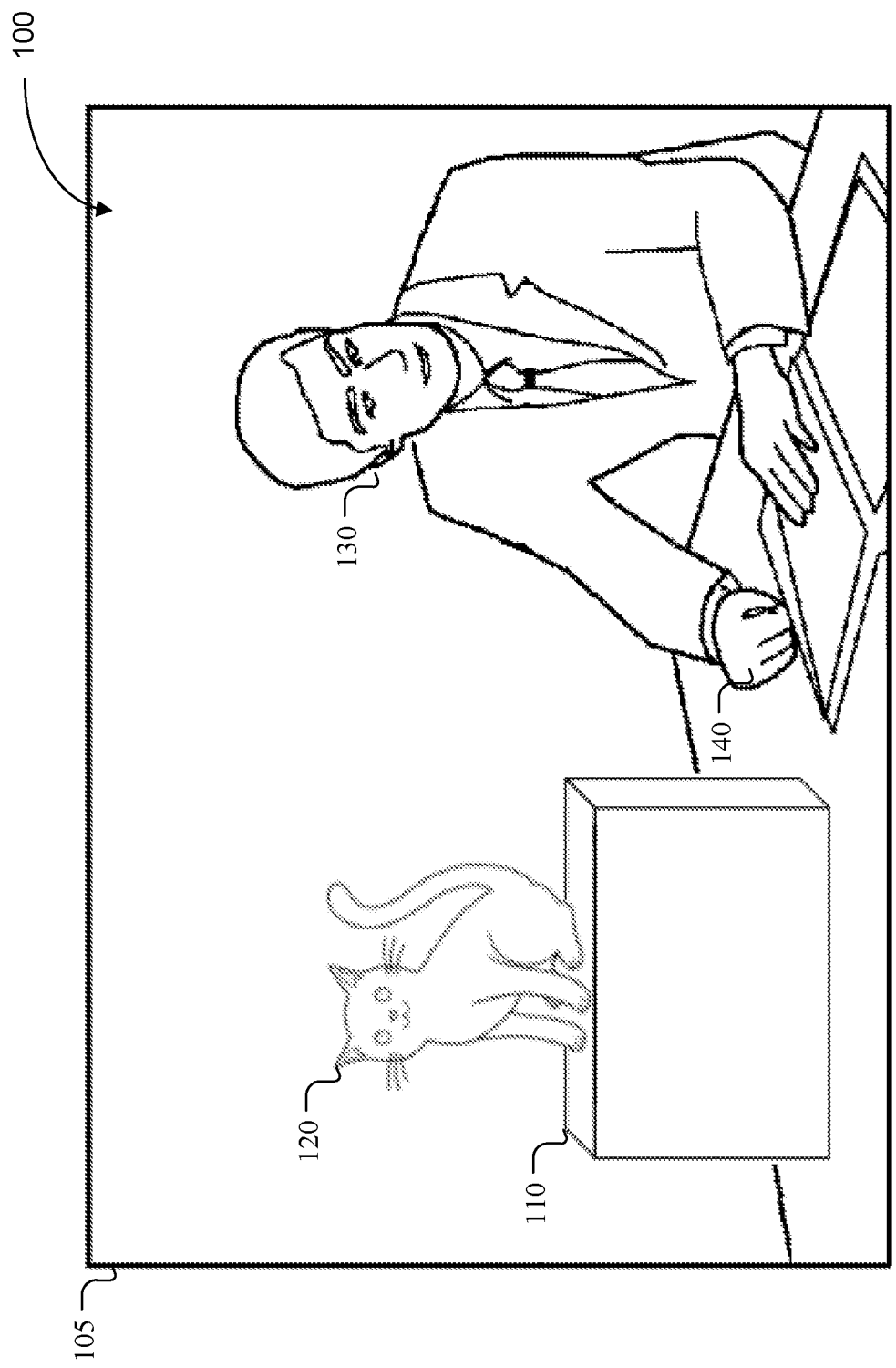
FIG. 1 illustrates an example real-world scene captured within an image or video frame.

FIG. 1 illustrates an example real-world scene 100 captured within an image or video frame 105. The illustrated scene 100 includes a box 110 with a cat 120 on top. The scene 100 further includes a person sitting at a desk, with his face 130 and hand 140 visible. In particular embodiments, the video frame 105, along with successive frames, may be processed by the AR application using one or more tracking algorithms to track objects of interest. In particular embodiments, the objects of interest may include any object that a user of the AR application taps on or interacts with through the AR application (e.g., the user may associate an AR effect with a particular object). In particular embodiments, the objects of interest may additionally or alternatively include any discernable or detectable object by the tracking algorithm.

Figure 2:
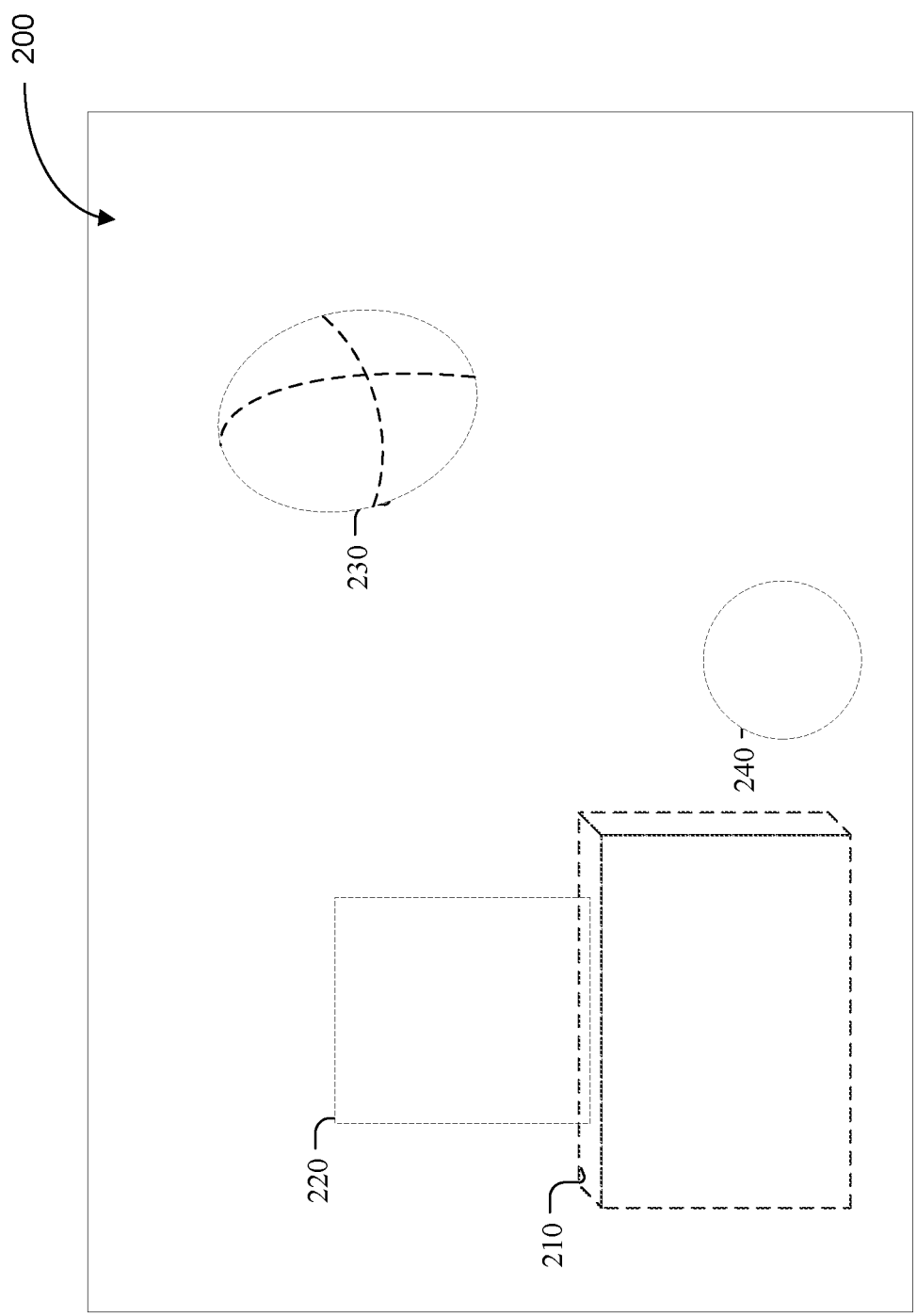
FIG. 2 illustrates an example of a visual representation of tracking data associated with certain objects of interest.

FIG. 2 illustrates an example of a visual representation of tracking data 200 associated with certain objects of interest. The visual representation of tracking data 200 may be associated with the real-world scene 100 shown in FIG. 1. For example, box 210 in FIG. 2 may represent tracking data for the real-world box 110 in FIG. 1; polygon 220 in FIG. 2 may represent tracking data for the cat 120 in FIG. 1; facial mesh 230 in FIG. 2 may represent tracking data for the person's face 130 in FIG. 1; and circle 240 in FIG. 2 may represent tracking data for the person's hand 140 in FIG. 1. In particular embodiments, the tracking data associated with the objects of interest in a scene may be generated using one or more tracking algorithms operating concurrently. For example, tracking data represented by box 210 may be generated using Simultaneous Localization and Mapping (SLAM); tracking data represented by polygon 220 may be generated using region-tracking algorithm; tracking data represented by facial mesh 230 may be generated using a face-tracking algorithm; and tracking data represented by circle 240 may be generated using a hand-tracking algorithm. In particular embodiments, the tracking algorithm used for tracking a particular object or region may be switched or adjusted independently from any other tracking algorithms used for tracking other objects or regions in the scene. For example, while the tracking algorithm used for tracking the person's face 130 may dynamically switch from facial-tracking algorithm to region-tracking algorithm, the tracking algorithms used for tracking the other objects (e.g., the box 110, cat 120, and/or hand 14) may remain unchanged.

In particular embodiments, it may be desirable to dynamically switch tracking algorithms because different algorithms have different degrees of computational requirements and are suitable for different types of scenes. One example of a tracking algorithm that tracks objects with high accuracy is Simultaneous Localization and Mapping (SLAM). At a high-level, SLAM is a technique used to generate, in real time, a 3D map of an unknown environment. SLAM is computationally intensive because it tries to generate a 3D model of the environment, and as such, it may require higher-end devices to perform as desired. The SLAM technique may employ sensor data from a variety of sensors, including, for example, cameras, LiDARs, radar, gyroscope, and any other suitable types of sensors. In particular embodiments, SLAM implemented on conventional mobile phones may use the phone's camera(s), gyroscope, and/or accelerometer. Conceptually, given a video frame, SLAM may estimate the relative position and orientation of the camera and features of interest in the scene (e.g., often edges, corners, etc.) and iteratively update the estimates based on motion and the resulting feature observations. Based on positional deviations of those features due to movement, SLAM may use triangulation techniques to generate a 3D model of the recognizable objects in the captured scene. For example, when the camera moves, a landmark point associated with a feature of interest may move. Movement of that landmark (and other landmarks) may be used to estimate the 3D position and orientation of objects.

Since the SLAM algorithm is based on landmark detection and tracking, SLAM is particularly useful for tracking stationary objects with clear edges, corners, or other easily distinguishable features that may be used as landmarks. The 3D model generated by SLAM may have an associated confidence scores. In particular embodiments, the confidence score may be based on the number of landmarks associated with a particular object. A high number of detectable landmarks may indicate that SLAM is able to accurately track objects within a scene. Conversely, if the number of landmarks for an object drops below a threshold (e.g., due to the scene having little distinguishable features or image blurring caused by excessive movement by the object and/or the camera), the system may deem the SLAM estimation to be untrustworthy.

Another example of a high-accuracy but computationally expensive algorithm is face tracking. In particular embodiments, face-detection algorithms may use machine-learning models to detect facial features (e.g., eyes, nose, mouth, etc.) and generate a facial mesh using points mapped to those features. In essence, a 3D model of the face is generated to track a person's face (and feature) movement and orientation. The facial mesh in particular embodiments may be an assembly of multiple (e.g., 32, 64, etc.) polygons (e.g., triangles, squares, etc.) that approximates the contours of a detected face. Using the facial mesh, the tracking algorithm may try to match the facial mesh with the face detected in each video frame. How well the facial mesh fits the face captured in a video frame may be represented as a confidence score (e.g., based on distance measurements and whether facial features corresponding to particular polygons are detectable). When the user's face is occluded (e.g., due to another object or the face turning in a manner that hides the user's face from view), the confidence score may drop. In particular embodiments, the confidence score may be 0 or 1, with 0 representing an undetectable face and 1 representing a detectable face (or vice versa).

Another tracking algorithm that an AR application may use is termed region-tracking algorithm, which is an appearance-based tracker in accordance with particular embodiments. The region-tracking algorithm in particular embodiments mainly process 2D pixel or texture information (aside from possibly generating a plane to model the location of the object in the video frame and using gyroscope data to determine the plane's orientation in 3D space). As such, it may be an example of a tracking algorithm that is less computationally expensive than SLAM and face tracking. Further, since the region-tracking algorithm tracks objects based on appearance information and does not rely on objects having particular geometries or features (e.g., corners, edges, eyes, nose, etc.), it may have wider applicability across different types of objects (e.g., bottles) and may be more tolerant to blurring. Even though region-tracking algorithm may be less accurate than SLAM and face-tracking algorithm, it may be faster (requires less computational resources), more robust, and suitable for tracking both static and moving objects (e.g., which may be due to the objects moving and/or the camera moving).

At a high-level, the region-tracking algorithm seeks to identify a region in a video frame that corresponds to an object and sees how it transforms in the next frame. In particular embodiments, the region-tracking algorithm may identify and track successive positions of an object in a series of video frame. Pixels of each video frame may be processed using a segmentation algorithm to identify segments that may correspond to real-world objects. The particular segmentation algorithm used may be, for example, motion-based or intensity-based, known to persons of ordinary skill in the art. Each identified segment may be labeled and represented using a polygon to approximate its shape and location within the scene. Each polygon's motion between frames may be assumed to be a 2D affine transformation. Using the object's polygon representation and the corresponding motion model (e.g., a machine-learning classifier) a prediction may be made as to where and how the polygon would appear in the next frame. The prediction may be compared to actual segments observed in that frame, and the object's polygon and motion model may be updated accordingly. Over several iterations, the algorithm may be able to detect with a level of confidence that two polygons appearing in their respective frames are likely the same object and label them as such. The confidence level may drop, however, if an object is sufficiently occluded (e.g., hidden by another object), transformed beyond the predictive ability of the current model, and/or lighting conditions changed significantly to hamper image processing.

In particular embodiments, another tracking algorithm that is even less computationally expensive than the region-tracking algorithm may be based on gyroscope data alone. A typical mobile device has a built-in gyroscope, which provides gyroscope data that describe the orientations of the associated mobile device. The orientation data is purely based on the gyroscope sensor, and as such no image processing is needed. Thus, real-time orientation data may be readily available even from low-end devices. In particular embodiments, tracking estimates based on gyroscope data alone may be used as the baseline tracking algorithm.

In particular embodiments, an AR application may be configured to use tracking algorithms with different characteristics and computational costs. For example, an AR application may use tracking algorithms with high computational costs (e.g., SLAM and face-tracking algorithms), tracking algorithms with medium computational costs (e.g., region-tracking algorithms), and tracking algorithms with low computational costs (e.g., based on gyroscope data without image processing). In particular embodiments, the AR application may switch between the algorithms based on their respective confidence scores. For example, the AR application may elect to use the most accurate tracking algorithm (e.g., SLAM or face-tracking algorithm) so long as its confidence score is higher than a predetermined threshold. If the confidence score is lower than a predetermined threshold, the AR application may switch to a relatively less accurate tracking algorithm (e.g., region-tracking algorithm) that is relatively less computationally expensive. In particular embodiments, the AR application may switch from one tracking algorithm to another dynamically during an AR session without the user ever being aware that the switching occurred.

In particular embodiments, different objects or regions within a scene may be tracked using different algorithms. For example, a user's face may be tracked using a face-tracking algorithm, tables and bookcases may be tracked using SLAM, and a roaming pet may be tracked using region tracking. The confidence score associated with each object may be independently generated and assessed to determine whether a different algorithm should be used. For example, if certain features of the table become hidden (e.g., blocked by the user), the SLAM's confidence score for the table may drop sufficiently to warrant a switch to region tracking. This may occur while the other tracking algorithms currently used for their respective objects or regions remain the same or change to whatever suitable tracking algorithm.

Figure 3:
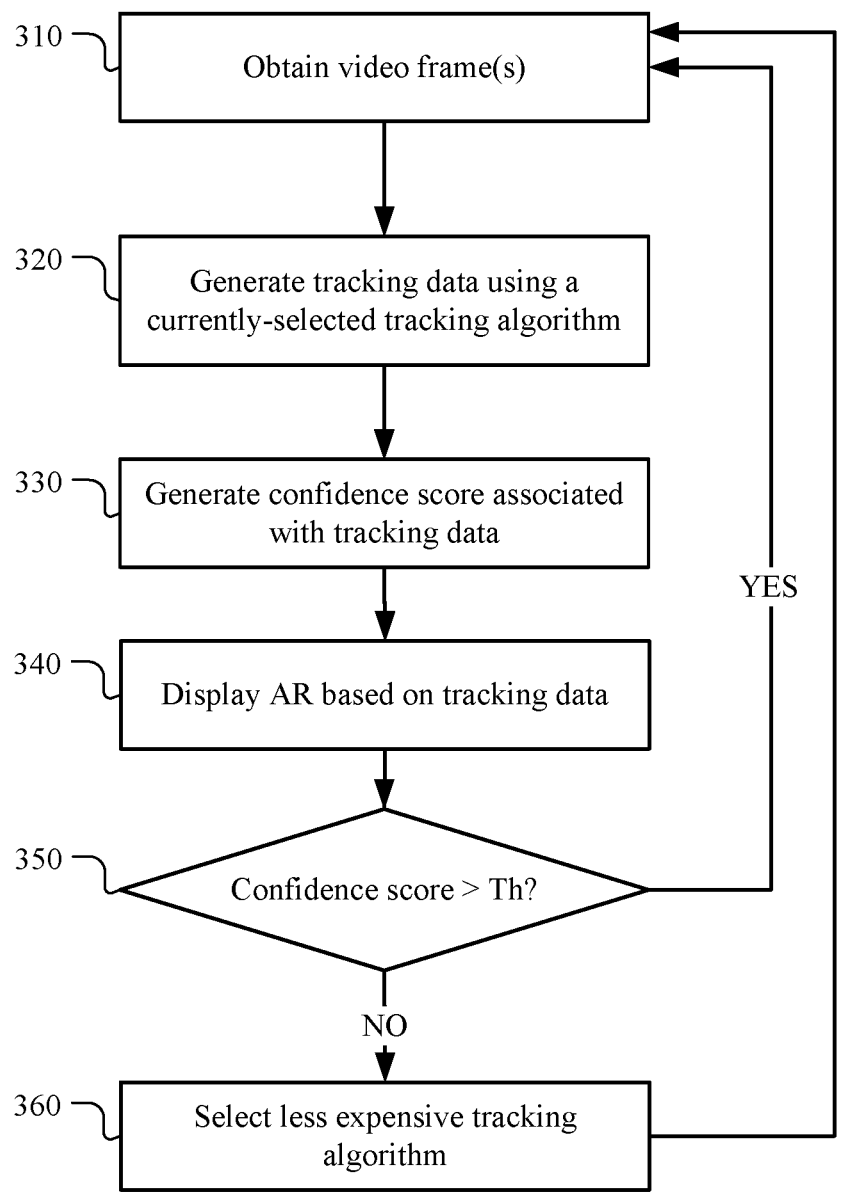
FIG. 3 illustrates an example method for dynamic degradation of tracking algorithms used by an AR application.

FIG. 3 illustrates an example method 300 for dynamic degradation of tracking algorithms used by an AR application. The method may begin at step 310, where a computing device (e.g. mobile phone) running an AR application may obtain one or more video frames associated with a scene. The video frames may be obtained from a repository or from a camera communicatively coupled to the device (e.g., a mobile phone's camera or a webcam attached to a laptop or desktop computer). In the latter case, the video frames may be capturing the scene in real time. The captured scene may include one or more objects, such as the ones shown in FIG. 1.

At step 320, the computing device may generate, based on the video frame(s), tracking data using a tracking algorithm. In particular embodiments, in a scenario where this step is performed when the AR application first begins tracking objects within the captured scene, the tracking algorithm may default to be one that provides high accuracy (but also high computational cost), such as SLAM or face-tracking algorithm. Additionally or alternatively, the tracking algorithm used may be selected based on, for example, a determination of whether particular characteristics are present in the scene, such as detection of a face (e.g., using face-detection classifiers), detection of geometric shapes (which may make SLAM particularly suitable), detection of movement, or any other characteristics suitable to be tracked by the tracking algorithm. In particular embodiments, the algorithm selected may additionally or alternatively be based on device capabilities, which may include immutable hardware capabilities (e.g., processor speeds, total memory, etc.) and currently available system resources (e.g., available processing bandwidth, available memory, etc.). As an example, if the AR application determines that the capabilities may support higher-tiered algorithms such as SLAM or face-tracking algorithm, such algorithm may be selected. Otherwise, a relatively lower-tiered algorithm that may run satisfactorily with the available resources may be selected instead. The tracking data generated using SLAM may be, for example, a 3D representation of the scene or an object within the scene. The tracking data generated using face-tracking algorithm may be, for example, the facial mesh and its spatial position and orientation, as described above.

At step 330, the device may generate a confidence score associated with the generated tracking data. In particular embodiments, the tracking algorithm used in step 320 may output the confidence score along with the tracking data. Alternatively or additionally, the confidence score may be generated by a scoring engine configured to measure how well the tracking data match the video frames. The confidence score may represent, for example, a level of confidence that that generated tracking data are accurate.

At step 340, the device may display an augmented-reality effect based on the tracking data. For example, if an AR effect is a computer-generated animation that is associated with the box 110 shown in FIG. 1, the animation may be superimposed over the video frame in a manner based on the position, dimensions, and/or orientation of the 3D model of the box 210, as shown in FIG. 2. As another example, if an AR effect is a mask that is to be placed over the person's face 130 in FIG. 1, the mask may be displayed in a manner based on the position, dimensions, and/or orientation of the facial mesh 230, as shown in FIG. 2. Since the AR effect is displayed based on the tracking data, whether the AR effect appears as expected or desired depends on the tracking data's accuracy.

At step 350, the device, in accordance with the AR application, may determine whether the confidence score associated with the tracking data is above a threshold (e.g., whether the confidence score satisfies one or more criteria). Conceptually, such determination based on the confidence score represents whether the tracking data are accurate or trustworthy. In particular embodiments, the threshold criteria may be associated with the particular tracking algorithm used. For example, the threshold criteria for the confidence score of SLAM may be different from that of face-tracking algorithm and/or region-tracking algorithm.

In a scenario where the confidence score is determined to be above the threshold (indicating that the current tracking algorithm is working sufficiently well), then the process may repeat (e.g., starting from step 310) so that subsequent video frames continue to be tracked using the same tracking algorithm that was just used to generate the tracking data and corresponding confidence score. For example, the device may obtain video frame(s), at step 310, associated with the scene, that are subsequent to the previously obtained video frame(s). Then, at step 320, the device may generate, based on the currently obtained video frame(s), tracking data using the same tracking algorithm that was used before. Continuing the earlier example where the initial algorithm used was SLAM or face-tracking algorithm, the same SLAM or face-tracking algorithm, respectively, may be used again to process the currently obtained video frame(s) and generate tracking data and an associated confidence score (at step 330).

The newly generated confidence score, however, may now be below a threshold (the threshold for indicating insufficiency of the confidence score may be the same as or different from the threshold for indicating sufficiency of the confidence score). The drop in confidence score may be due to a variety of factors. For example, other applications executing on the device may be competing for resources. As another example, some changes in the scene may have affected the tracking algorithm's tracking accuracy. For instance, if the tracking algorithm is SLAM, excessive movement of the camera, movement of the object being tracked, and/or landmark features being occluded may impair SLAM's ability to track the landmark features. For the face-tracking algorithm, the drop in confidence score may be due to another object occluding the face that is being tracked, the camera panning to a scene where the face is no longer visible, and/or the face turning away from the camera. Whatever the reason, the confidence score dropping below the threshold indicates that the tracking data may no longer be sufficiently accurate. In particular embodiments, the AR effect may be displayed based on the tracking data despite the possible inaccuracy. In particular embodiments, the AR effect may be displayed based on the previously generated tracking data that were deemed to be sufficiently accurate. In particular embodiments, the AR effect may be displayed based on the next tracking data with sufficiently high confidence score.

Upon determining that the confidence score is below the threshold (at step 350), the device may select, at step 360, an alternative tracking algorithm to perform subsequent tracking. As previously explained, one reason for the confidence score dropping may be due to characteristics in the current scene being unsuitable for the current tracking algorithm. Another reason may be that, due to time constraints for generating tracking data sufficiently quickly, a drop in system resources (e.g., memory, processing power, etc.) may affect the quality or accuracy of the tracking algorithm (e.g., less processing iterations to generate tracking predictions). Continuing with the example above, if the current tracking algorithm is SLAM, which is highly accurate but less robust than other supported algorithms, a drop in confidence score may indicate that the characteristics in the current scene may be unsuitable for SLAM (e.g., excessive motion and/or lack of clearly discernable landmark). In particular embodiments, in response to the confidence score dropping below a threshold, the device may select region-tracking algorithm, since it is a more robust (albeit less accurate) algorithm relative to SLAM and the face-tracking algorithm. Using the more robust region tracking algorithm may help address the issues that SLAM is experience with the current scene. In particular embodiments, the threshold with which the current confidence score is compared with may be the confidence scores of the alternative tracking algorithms. For example, the device may calculate confidence scores for both SLAM and the region tracking algorithm at every frame and switch from SLAM to region tracking when SLAM's confidence score drops below that of region tracking. In particular embodiments, the AR application may have a predetermined hierarchy of the tracking algorithms that it implements. For example, SLAM and the face-tracking algorithm may be the most preferable where possible, followed by the region-tracking algorithm, and ending with the gyroscope-based algorithm as the baseline algorithm.

Turning to step 310, the device may again obtain additional video frame(s) associated with the scene, subsequent to the previously obtained frames of the video. At step 320, the device may generate, based on the currently-obtained video frame(s), tracking data using the less computationally expensive tracking algorithm, selected at step 360 in response to the determination that the confidence score from the more expensive tracking algorithm (e.g., SLAM or face-tracking algorithm) is insufficient. Continuing with the example described above, the algorithm selected for current use may be the region-tracking algorithm, in which case a confidence score associated with the tracking data may be generated (e.g., at step 330) and the AR effect may be displayed based on the tracking data (e.g., at step 340). As another example, instead of using the region-tracking algorithm, the device may use a gyroscope-based algorithm that does not process the currently-obtained video frame(s). This may occur, for example, if the AR application determines that the region-tracking algorithm would not perform satisfactorily (e.g., due to limited available system resources or insufficient tracking features in the video frames, which may be due to lack of lighting or excessive lighting that washes out texture details). As another example, the AR application may simply not implement the region-tracking algorithm (in other words, the gyroscope-based algorithm may be next in the hierarchy of algorithms after SLAM and the face-tracking algorithm).

In particular embodiments, when the AR application transitions from one tracking algorithm (e.g., SLAM) to another (e.g., region-tracking algorithm), the existing tracking data generated using the last algorithm may be processed and transformed into a format that is compatible with or makes sense to the replacement algorithm. For example, depth information is modeled and understood by SLAM but not by the region-tracking algorithm. Thus, when transitioning from SLAM to the region-tracking algorithm, the device may transform the SLAM tracking data into 2D tracking data compatible with or understood by the region-tracking algorithm. In particular embodiments, this transformation process may conceptually be performed by projecting a ray from a point of interest in 3D space to the camera, and the point at which the ray intersects a plane (e.g., representing the image plane of the scene) may be the 2D representation of that point. The 2D version of the existing tracking data may then be used by the region-tracking algorithm to generate the current tracking data. A similar process may be performed for transforming face-tracking data to 2D, in accordance with particular embodiments.

Continuing with the example where the tracking algorithm used is the region-tracking algorithm, the device may then determine, at step 350, whether the confidence score associated with the tracking data from the region-tracking algorithm is below a threshold for the region-tracking algorithm. If the confidence score satisfies the threshold criteria, the AR application may continue to track objects using the region-tracking algorithm. On the other hand, if the confidence score fails to meet the threshold criteria, the AR application, at step 360, may select a less computationally expensive tracking algorithm, such as the gyroscope-based algorithm.

In the next iteration, the device may again obtain the current video frame(s) associated with the scene, the current video frame(s) being frames subsequent to the previously obtained frames in the video. However, since the AR application is currently configured to use the gyroscope-based algorithm, the currently-obtained video frame(s) in particular embodiments would not be processed for purposes of tracking objects. Instead, the AR application may display the AR effect based on only gyroscope data from a gyroscope of the computing device. In particular embodiments, accelerometer data from an accelerometer of the computing device may be used alternatively or additionally. Gyroscope data and accelerometer data may be used to determine changes in the device's orientation and position, respectively. Conceptually, the gyroscope-based algorithm (which may also utilize accelerometer data) may assume that the objects in the scene remain static in the real world (in other words, their relative positions and orientation remain the same). What may change, however, is the camera's position and orientation relative to the scene. As such, in particular embodiments, the gyroscope-based algorithm may update the previously-generated tracking data (e.g., as generated by SLAM, the face-tracking algorithm, and/or the region-tracking algorithm) based on changes in the camera's orientation and/or position. The AR effects may then be displayed based on the updated tracking data. In another embodiment, the previously displayed AR effects may be directly updated using the orientation and/or position data without updating the previously-generated tracking data.

In particular embodiments, the process described above with respect to FIG. 3 may be independently applied to each object appearing in the scene. For instance, the example described above with respect to FIG. 3 may be associated with a first object in the scene, such as the box 110 in FIG. 1. While the tracking algorithm used for tracking the box 110 changes, another object in the scene (e.g., the cat 120 in FIG. 1) may be continuously tracked using a particular algorithm (or a different progression of algorithms). For example, for the box 110, a first set of video frames may be processed using SLAM, a second set of video frames may be processed using the region-tracking algorithm, and a third set of video frames may be processed using the gyroscope-based algorithm. The first, second, and third sets of video frames may span a time frame. Independent from the algorithms used for tracking the box 110, the cat 120 may be tracked using the region-tracking algorithm (or any other suitable tracking algorithm) through the same time frame. For instance, the region-tracking algorithm may generate tracking data using the same first, second, and third sets of video frames used to track the box 110. Another AR effect associated with the cat 120 may be displayed based on the tracking data generated by the region-tracking algorithm through that time frame.

While the process described above with respect to FIG. 3 may use confidence score as the metric for determining when to switch tracking algorithms, it should be appreciated that the metric may alternatively or additionally be based on any other measure of desired tracking characteristics. For example, the aforementioned confidence score may represent the likely accuracy of tracking data. What also may be relevant is the performance of the tracking algorithm. Since AR effects in particular embodiments may need to be displayed in real time and appear smooth in the video being augmented, the tracking algorithm would need to perform its task sufficiently quickly. In particular embodiments, performance may be measured based on the number of AR frames generated while a particular tracking algorithm is being used. The measure may be based on, for example, frame rate (e.g., number of frames per second, such as 15 frames per second) and/or the number of frames dropped per time period (e.g., number of frames less than the target, such as 30 frames, per second). In particular embodiments, the AR application may decide to switch from a higher-tiered tracking algorithm to a lower-tiered tracking algorithm if one or both the confidence score and the performance score are below their respective one or more thresholds or criteria. In situations where the current performance score is inadequate, selection of the replacement algorithm for replacing the current algorithm may be based on their relative computational costs. For example, if the performance score of SLAM is insufficient, then an algorithm such as region tracking may be selected due to its relatively lower computational cost. In particular embodiments, the aforementioned confidence score may be defined to reflect both the accuracy and performance of an algorithm. For example, the confidence score may be computed based on frame count (or frame drop), which reflects performance, as well as the tracking accuracy output by the tracking algorithm used.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for dynamic degradation of tracking algorithms, including the particular steps of the method of FIG. 3, this disclosure contemplates any suitable method for dynamic degradation of tracking algorithms, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

As described above, particular embodiments may first try the more accurate tracking algorithm before downgrading. In certain situations, the AR application may determine that a particular tracking algorithm would not produce the desired result even before trying it. For example, particular embodiments of SLAM, as described above, may be using deviations in feature landmarks caused by camera movement to generate a 3D model of the environment. Thus, in particular embodiments, the AR application upon starting may determine whether the camera is moving based on data from the device's gyroscope and/or accelerometer. If no motion is detected, the AR application may start off with using the region-tracking algorithm rather than SLAM. If, on the other hand, motion is detected, the AR application may start with SLAM, as described above.

In particular embodiments, further AR optimization may be gained by determining from the outset whether or not a device may utilize the more computationally expensive algorithms, such as SLAM. For low-end devices, not only may computational resources be limited, storage may also be limited. Thus, particular embodiments may determine whether a device has the minimum system requirements to handle a computationally expensive tracking algorithm before the corresponding software module is downloaded onto the device. For example, a device may initially download and install an AR application from a distribution source, such as an application store. The AR application may not be bundled with a software module for a computationally expensive tracking algorithm, such as SLAM. When the AR application first launches, it may be configured to query the device to determine whether its capabilities meet the minimum system requirement (e.g., a threshold level of processing speed or class, a threshold amount of memory, etc.) for executing the computationally expensive tracking algorithm. If the requirement is met, the AR application may proceed to download the software module associated with the tracking algorithm. On the other hand, if the requirement is not met, the AR application may avoid downloading the software module to save on storage space, since it is unlikely that the software module would be used (e.g., tracking data generated by it may have insufficient confidence score or performance score to warrant continued usage of the tracking algorithm).

In particular embodiments, the AR application may also adjust configurations or parameters of a tracking algorithm based on the device's capabilities. For example, the AR application may be configured to ascertain the capabilities of the device on which the application is running. Even though the device's capabilities may be sufficient to run a particular tracking algorithm, the capabilities may be on the low end of the acceptable spectrum and thus the tracking algorithm may be more at risk of performing inadequately. To address this, upon determining that one or more capabilities of the device are below one or more predetermined capability standards (e.g., based on processor speed or class, memory size, etc.), the AR application may configure the affected tracking algorithm(s) to reduce tracking granularity. For example, for SLAM, the number of landmarks used for tracking objects may be reduced. As another example, for the face-recognition algorithm, the number of polygons used in a facial mesh may be reduced. As yet another example, for the region-tracking algorithm, the number of regions or segments used for tracking may be reduced.

In particular embodiments, the AR application may also upgrade the algorithm used for tracking a particular object. For example, periodically, the AR application may try using, in the background, a higher-tiered algorithm (e.g., more accurate but also more computationally expensive algorithm, such as SLAM) to see whether the confidence score is sufficient to warrant upgrading to that algorithm. Upgrading may make sense in situations where downgrades occurred due to environmental or situational factors (e.g., sudden movements of the camera and/or object caused the confidence score of SLAM to drop, or sudden bright light caused the confidence score of the region-tracking algorithm to drop), and not because the capability of the device is inadequate. For example, if higher-tiered algorithms have been used for extended periods of time in the past on a particular device, the AR application may have learned that using such algorithms are possible, and therefore may try to use them. Similarly, if both a lower-tiered algorithm and a higher-tiered algorithm are concurrently being used to track different objects in a scene (an indication that the device is capable of supporting the higher-tiered algorithm), the system may try periodically to see if it is possible to use the higher-tiered tracking algorithm to track those objects that are currently being tracked using the lower-tiered algorithm. If the higher-tiered algorithm indeed performs satisfactorily, the AR application may switch from using the lower-tiered algorithm to the higher-tiered algorithm.

Figure 4:
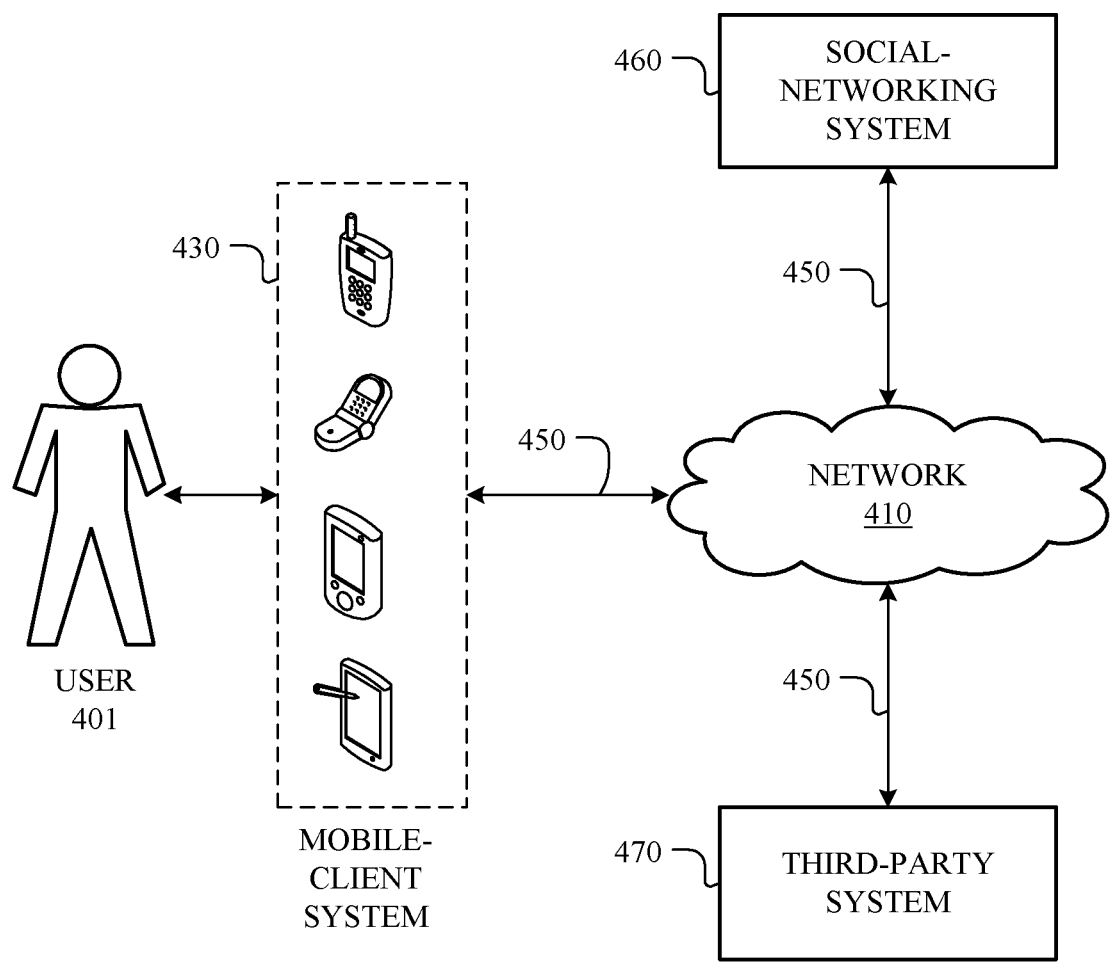
FIG. 4 illustrates an example network environment.

FIG. 4 illustrates an example network environment 400 associated with a social-networking system. Network environment 400 includes a user 401, a client system 430, a social-networking system 460, and a third-party system 470 connected to each other by a network 410. Although FIG. 4 illustrates a particular arrangement of user 401, client system 430, social-networking system 460, third-party system 470, and network 410, this disclosure contemplates any suitable arrangement of user 401, client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of users 401, client systems 430, social-networking systems 460, third-party systems 470, and networks 410, this disclosure contemplates any suitable number of users 401, client systems 430, social-networking systems 460, third-party systems 470, and networks 410. As an example and not by way of limitation, network environment 400 may include multiple users 401, client system 430, social-networking systems 460, third-party systems 470, and networks 410.

In particular embodiments, user 401 may be an individual (human user), an entity (e.g., an enterprise, business, or third-party application), or a group (e.g., of individuals or entities) that interacts or communicates with or over social-networking system 460. In particular embodiments, social-networking system 460 may be a network-addressable computing system hosting an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. In particular embodiments, social-networking system 460 may include an authorization server (or other suitable component(s)) that allows users 401 to opt in to or opt out of having their actions logged by social-networking system 460 or shared with other systems (e.g., third-party systems 470), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 470 may be a network-addressable computing system that can host AR applications or separate modules associated with each tracking algorithm. Third-party system 470 may be accessed by the other components of network environment 400 either directly or via network 410. In particular embodiments, one or more users 401 may use one or more client systems 430 to access, send data to, and receive data from social-networking system 460 or third-party system 470. Client system 430 may access social-networking system 460 or third-party system 470 directly, via network 410, or via a third-party system. As an example and not by way of limitation, client system 430 may access third-party system 470 via social-networking system 460. Client system 430 may be any suitable computing device, such as, for example, a personal computer, a laptop computer, a cellular telephone, a smartphone, a tablet computer, or an augmented/virtual reality device.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

Figure 5:
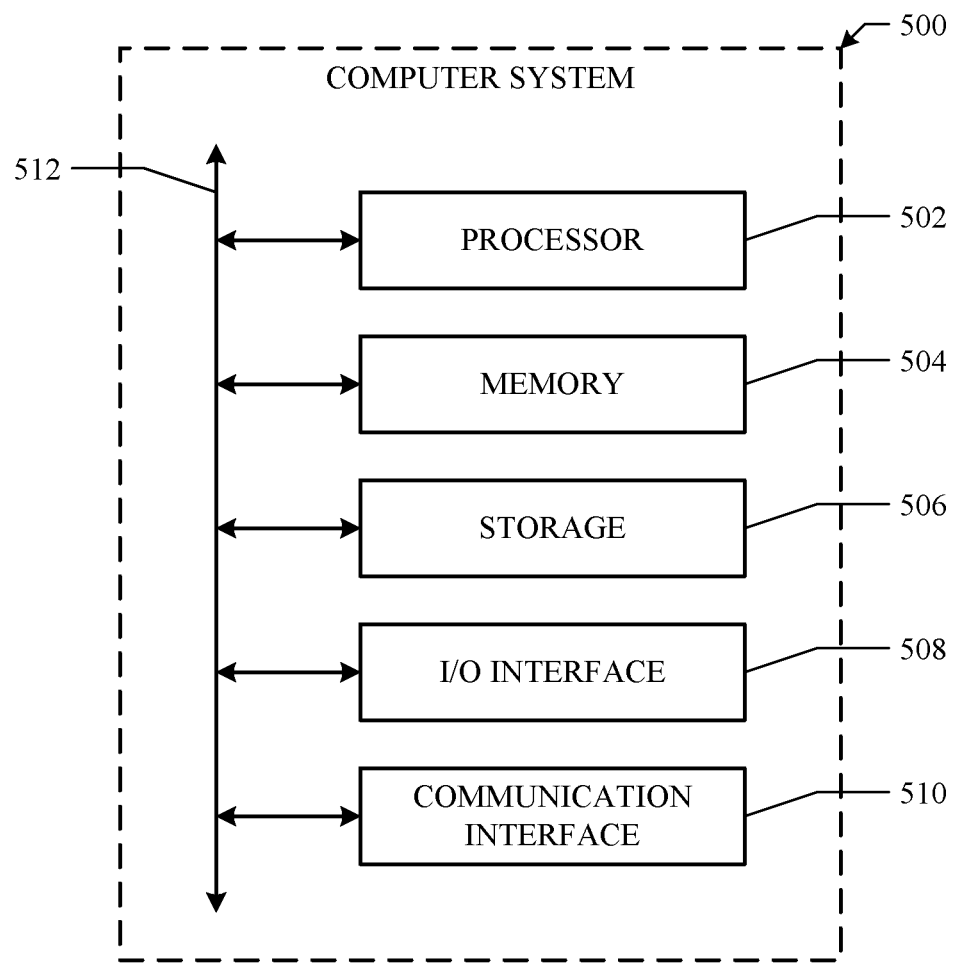
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. 1/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising, by a computing device:
   obtaining a first set of video frames associated with a scene;
   generating, based on the first set of video frames, first tracking data using a first tracking algorithm;
   generating, based on the first tracking data, a first confidence score associated with the first tracking algorithm, wherein the first confidence score is indicative of a confidence level of the first tracking algorithm in tracking objects in the first set of video frames;
   displaying an augmented-reality effect based on the first tracking data;
   generating a performance score based on a number of frames of the augmented-reality effect displayed based on the first tracking data;
   selecting, in response to a determination that the first confidence score and the performance score fail to satisfy one or more criteria, a second tracking algorithm to be used for tracking objects within a second set of video frames subsequent to the first set of video frames;
   switching from the first tracking algorithm to the second tracking algorithm based on the selecting;
   obtaining the second set of video frames associated with the scene;
   generating, based on the second set of video frames, second tracking data using the second tracking algorithm; and
   displaying the augmented-reality effect based on the second tracking data.

2. The method of claim 1, further comprising:
   generating a second confidence score associated with the second tracking data;
   determining that the second confidence score fails to satisfy a second criteria;
   obtaining a third set of video frames associated with the scene, the third set of video frames being subsequent to the second set of video frames; and
   displaying the augmented-reality effect with the third set of video frames based on gyroscope data from a gyroscope of the computing device.

3. The method of claim 1, wherein the first tracking data and the second tracking data are associated with a first object in the scene, the method further comprising:
   generating, using the first tracking algorithm, the second tracking algorithm, or a third tracking algorithm, third tracking data associated with a second object in the scene, the third tracking data being based on the first set of video frames or the second set of video frames; and displaying a second augmented-reality effect based on the third tracking data.

4. The method of claim 1, further comprising:

transforming the first tracking data to a format compatible with the second tracking algorithm;

wherein the generating of the second tracking data is further based on the transformed first tracking data.

5. The method of claim 1, further comprising:

determining that one or more capabilities of the computing device are below one or more predetermined capability standards; and configuring the first tracking algorithm or the second tracking algorithm to reduce tracking granularity.

6. The method of claim 1, further comprising:

determining that one or more capabilities of the computing device satisfy one or more predetermined capability standards; and downloading software associated with the first tracking algorithm based on the determining that the one or more capabilities satisfy the one or more predetermined capability standards.

7. The method of claim 1, wherein the second tracking algorithm is selected from a predetermined hierarchy of tracking algorithms comprising the first tracking algorithm and the second tracking algorithm.

8. The method of claim 1, wherein the first tracking algorithm is a SLAM algorithm or facial-recognition algorithm, and wherein the second tracking algorithm is a region tracking algorithm.

9. A system comprising: one or more processors and one or more computer-readable non-transitory storage media coupled to one or more of the processors, the one or more computer-readable non-transitory storage media comprising instructions operable when executed by one or more of the processors to cause the system to:

obtain a first set of video frames associated with a scene;

generate, based on the first set of video frames, first tracking data using a first tracking algorithm;

generate, based on the first tracking data, a first confidence score associated with the first tracking algorithm, wherein the first confidence score is indicative of a confidence level of the first tracking algorithm in tracking objects in the first set of video frames;

display an augmented-reality effect based on the first tracking data;

generate a performance score based on a number of frames of the augmented-reality effect displayed based on the first tracking data;

select, in response to a determination that the first confidence score and the performance score fail to satisfy one or more criteria, a second tracking algorithm to be used for tracking objects within a second set of video frames subsequent to the first set of video frames;

switch from the first tracking algorithm to the second tracking algorithm based on the selection;

obtain the second set of video frames associated with the scene;

generate, based on the second set of video frames, second tracking data using the second tracking algorithm; and display the augmented-reality effect based on the second tracking data.

10. The system of claim 9, wherein the processors are further operable when executing the instructions to:

generate a second confidence score associated with the second tracking data;

determine that the second confidence score fails to satisfy a second criteria;

obtain a third set of video frames associated with the scene, the third set of video frames being subsequent to the second set of video frames; and display the augmented-reality effect with the third set of video frames based on gyroscope data from a gyroscope of the system.

11. The system of claim 9, wherein the first tracking data and the second tracking data are associated with a first object in the scene, wherein the processors are further operable when executing the instructions to:

generate, using the first tracking algorithm, the second tracking algorithm, or a third tracking algorithm, third tracking data associated with a second object in the scene, the third tracking data being based on the first set of video frames or the second set of video frames; and display a second augmented-reality effect based on the third tracking data.

12. The system of claim 9, wherein the processors are further operable when executing the instructions to:

transform the first tracking data to a format compatible with the second tracking algorithm;

wherein the generation of the second tracking data is further based on the transformed first tracking data.

13. One or more computer-readable non-transitory storage media embodying software that is operable when executed to cause one or more processors to:

obtain a first set of video frames associated with a scene;

generate, based on the first set of video frames, first tracking data using a first tracking algorithm;

generate, based on the first tracking data, a first confidence score associated with the first tracking algorithm, wherein the first confidence score is indicative of a confidence level of the first tracking algorithm in tracking objects in the first set of video frames;

display an augmented-reality effect based on the first tracking data;

generate a performance score based on a number of frames of the augmented-reality effect displayed based on the first tracking data;

select, in response to a determination that the first confidence score and the performance score fail to satisfy one or more criteria, a second tracking algorithm to be used for tracking objects within a second set of video frames subsequent to the first set of video frames;

switch from the first tracking algorithm to the second tracking algorithm based on the selection;

obtain the second set of video frames associated with the scene;

generate, based on the second set of video frames, second tracking data using the second tracking algorithm; and display the augmented-reality effect based on the second tracking data.

14. The media of claim 13, wherein the software is further operable when executed to cause the one or more processors to:

generate a second confidence score associated with the second tracking data;

determine that the second confidence score fails to satisfy a second criteria;

obtain a third set of video frames associated with the scene, the third set of video frames being subsequent to the second set of video frames; and display the augmented-reality effect with the third set of video frames based on gyroscope data from a gyroscope.

15. The media of claim 13, wherein the first tracking data and the second tracking data are associated with a first object in the scene, wherein the software is further operable when executed to cause the one or more processors to:
generate, using the first tracking algorithm, the second tracking algorithm, or a third tracking algorithm, third tracking data associated with a second object in the scene, the third tracking data being based on the first set of video frames or the second set of video frames; and
display a second augmented-reality effect based on the third tracking data.

16. The media of claim 13, wherein the software is further operable when executed to cause the one or more processors to:
transform the first tracking data to a format compatible with the second tracking algorithm;
wherein the generation of the second tracking data is further based on the transformed first tracking data.

17. The system of claim 9, wherein the second tracking algorithm is selected from a predetermined hierarchy of tracking algorithms comprising the first tracking algorithm and the second tracking algorithm.

18. The system of claim 9, wherein the first tracking algorithm is a SLAM algorithm or facial-recognition algorithm, and wherein the second tracking algorithm is a region tracking algorithm.

19. The media of claim 13, wherein the second tracking algorithm is selected from a predetermined hierarchy of tracking algorithms comprising the first tracking algorithm and the second tracking algorithm.

20. The media of claim 13, wherein the first tracking algorithm is a SLAM algorithm or facial-recognition algorithm, and wherein the second tracking algorithm is a region tracking algorithm.

* * * * *